UNITED STATES PATENT OFFICE.

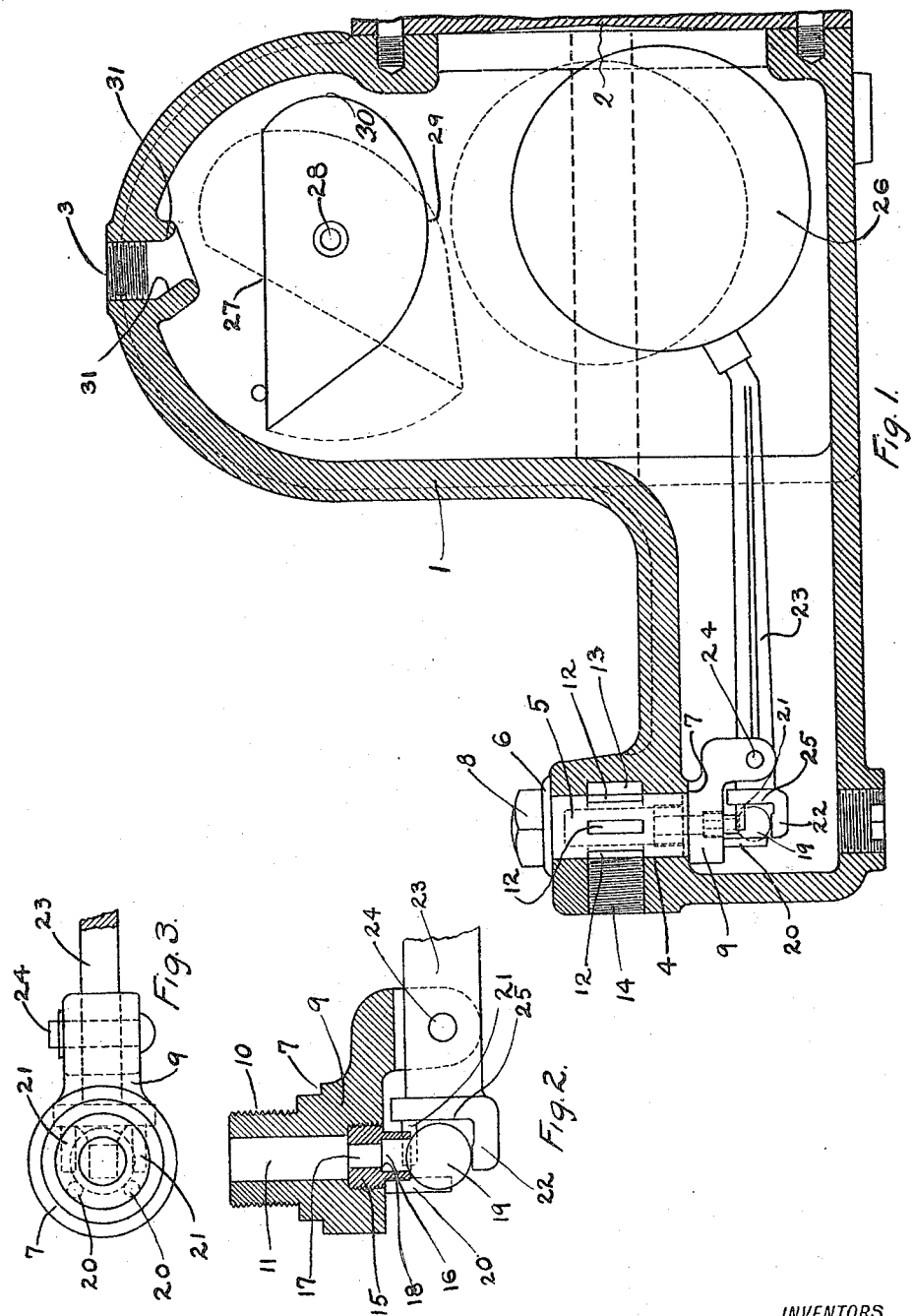

GEORGE W. LONG, OF NEW YORK, N. Y., AND WILLIAM K. SIMPSON, OF EAST ORANGE, NEW JERSEY, ASSIGNORS OF ONE-THIRD TO HARRY H. SEABROOK, OF NEW YORK, N. Y.

STEAM-TRAP.

1,123,770.      Specification of Letters Patent.      Patented Jan. 5, 1915.

Application filed June 3, 1912. Serial No. 702,413.

*To all whom it may concern:*

Be it known that we, GEORGE W. LONG, a citizen of the United States, and a resident of New York city, borough of Brooklyn, State of New York, and WILLIAM K. SIMPSON, a citizen of the United States, and a resident of East Orange, county of Essex, and State of New Jersey, have invented certain new and useful Improvements in Steam-Traps, of which the following is a specification.

Our invention relates to improvements in steam traps and the like, and more especially to improvements in the devices described in United States Letters Patent, No. 790,877 and No. 790,878.

One object of our invention is to provide an arrangement in which the valve will have a more positive action and a more efficient and much longer life. This we accomplish by causing the ball of the valve to rotate, whereby a new seating surface thereon is presented with each operation of the valve.

A further object of our invention is to provide an improved form and arrangement of inlet port whereby it coöperates in tending to return the tipping bucket to its normal upright position.

A further object of our invention is to provide an improved form of valve plug which may be more easily removed and put in place than the old form of tapered plug, and which forms a tighter steam joint.

A further object of our invention is to construct the discharge orifice so that it will operate more efficiently.

A further object of our invention is to provide a tipping bucket of novel shape so that its capacity is much increased.

Further objects, features and advantages will more clearly appear from the detailed description given below taken in connection with the accompanying drawings which form a part of this specification.

In the drawings Figure 1 is a vertical section through a steam trap embodying our improvements in one form. Fig. 2 is a vertical sectional detail of the ball valve; and Fig. 3 is a plan view of parts shown in Fig. 2.

Referring to the various figures, 1 represents a suitable casing provided with a removable cover 2, and having an inlet at 3 and an outlet at 4. In the outlet 4 is situated a cylindrical valve plug 5 snugly fitting the same at top and bottom, and held in place by phosphor bronze shoulders 6 and 7, the first being carried by a nut head 8 rigid with the plug and the second being carried by a valve supporting member 9 screwed into the valve plug by threads 10. The valve supporting member 9 is provided with an exit opening 11 which extends up into the valve plug 5 from which the water passes out through a plurality of openings 12 into an enlarged portion 13 of the outlet port 4. The casing 1 is threaded at 14 for engagement with any suitable exhaust pipe.

Screwed into the valve plug 5 is a discharge orifice member 15 having a central cylindrical discharge orifice passing up therethrough, which is larger at its inside end 16 than at its discharge end 17, so that a circumferential shoulder 18, breaks up or upsets the outgoing stream of water so that a hollow stream will not be formed which would permit the escape of steam. The lower circular end of the member 15 acts as a valve seat for the ball 19 which acts as a valve.

The ball valve 19 is carried by a cage comprising two pins 20 projecting from the member 9 and rigid with the casing, and two pins 21 and a foot pin 22 carried on the end of the short arm of an operating lever 23 pivoted at 24, in a fork depending from the member 9. The ball 19 fits loosely between the pins 20, 21, 22 and the abutting end 25 of the lever so that the ball is capable of some independent movement therebetween. Attached to the end of the long arm of the lever 23 is a float 26.

Situated just below the inlet port 3 is a tipping bucket 27, pivoted to the casing by means of journals at 28. The bucket is curved on its bottom at 29 and on one of its ends at 30 in order that the maximum capacity is obtained for a bucket of the type that becomes unbalanced and dumps when the center of gravity is changed by addition of water or the like thereto. The inlet port 3 is deflected and constricted at 31 so that it is at an angle to the vertical and is directed at one side of the pivotal axis of the bucket 27, whereby the swirl caused by the flow of steam and water under pressure is broken up and the water prevented from spreading or spraying laterally outside of the bucket and also inrush of water through the inlet port tends to return and maintain the bucket in its horizontal normal position to receive water from the inlet.

In operation the water being delivered through the port 3 either tends to cause the bucket 27 to return to its horizontal position or remain so, whereby the bucket becomes filled until a sufficiently greater amount of water is deposited on the left hand side of the pivotal axis in the bucket, than on the right hand side, to overcome the extra weight on the heavier end of the bucket at 30, so that the bucket automatically precipitates its contained water to the bottom of the trap, causing the water level in the trap to rise, which in turn instantly causes the float to rise. This causes the pins 21 to push the ball 19 away from its seat thereby opening the valve and allowing the pressure in the trap to expel water therefrom until the water level again drops to normal. The float following, the receding water level closes the valve. When the movable pins 21 push the ball 19 downward a slight wedging effect is produced on the ball between them and the fixed pins 20, whereby the ball is given a slight rotative movement as it rolls along the pins 20. When the float operating the foot 22 returns the ball toward its seat the same surface of the ball is not presented to the seat. This is due to the fact that in the last part of the upward movement of the ball the pressure picks up the ball and seats it, the motion being in a straight line without rotation. This action is possible because of the clearance or play between the ball and its retaining cage. It is also due to the fact that in opening the valve the ball moves against the flow of the discharging water being held tightly against the pins. In closing, the ball moves with the current and has more freedom of movement and consequently will move in a straight line without rotation. Therefore, the ball is given an intermittent rotative movement to change its seating surface as the valve operates, whereby the wear on the ball is more evenly distributed and the life of the parts greatly prolonged.

By directing the inlet port at the proper side of the pivotal axis of the bucket the impulse of the incoming stream of water forces the bucket back into its horizontal filling position in a more positive manner, thus preventing it remaining in a dumping position, and insuring the periodic filling and precipitating with the resultant desirable periodic opening and closing of the discharge valve.

By forming the discharge orifice larger on the inlet end than on the discharge end a construction or series of constructions is formed which upsets the swirling eddy in the discharge jet, and increases the capacity, and makes a solid outflowing stream, instead of a hollow jet which would allow the steam to short-circuit and escape.

By forming the valve plug 5 cylindrical in shape it can more easily be removed than the tapered and other forms of plugs, and a better joint is made by the two flat finished shoulders 6 and 7 drawn against the two similar flat iron surfaces by the threaded spud on the valve yoke 9. The substitution of flat bearing surfaces for tapered, and the reduction of these surfaces to the minimum necessary to make a steam-tight joint in a pressure device of this kind, permits the ready removal of the entire valve mechanism and float.

Although we have described our improvements in great detail and with respect to one particular embodiment, nevertheless we do not desire to be limited to such details except as clearly pointed out in the appended claims since many changes and modifications may be made without departing from the spirit and scope of our invention in its broader aspects.

Having fully and clearly described our improvements, what we claim and desire to secure by Letters Patent, is:

1. A steam trap comprising a suitable casing having outlet and inlet ports; a float-controlled-ball valve controlling the outlet port, and a tipping bucket adapted to receive water from the inlet port and intermittently precipitate the same, to intermittently operate the ball valve, said outlet port having a discharge orifice with a circumferential shoulder in a plane substantially at right angles to the discharge so that the orifice is larger on the inside end than on the discharge end whereby the efficiency of the orifice is increased.

2. A steam trap comprising a suitable casing having outlet and inlet ports, said outlet port having a discharge orifice with a circumferential shoulder in a plane substantially at right angles to the discharge so that the orifice is larger on the inside end than on the discharge end whereby the efficiency of the orifice is increased.

3. A steam trap comprising a suitable casing having outlet and inlet ports, said outlet port having a discharge orifice which is larger on the inside end than on the discharge end whereby the efficiency of the orifice is increased.

4. A steam trap comprising a casing having inlet and outlet ports, and a cylindrical valve plug in the outlet port provided with a discharge orifice therethrough and means for securing the plug in place, said discharge orifice being provided with a circumferential shoulder in a plane substantially at right angles to the discharge so that the orifice is larger on the inside than on the discharge side.

5. A steam trap comprising a suitable casing having inlet and outlet ports, a float controlled ball valve controlling the outlet port, and a tipping bucket adapted to receive water from the inlet port and intermittently dump the same in the casing to operate the valve, said outlet port having a discharge orifice with a constriction therein to upset the swirling eddy of the discharge jet and make a solid outflowing stream.

6. A steam trap comprising a suitable casing having inlet and outlet ports, a valve controlling the outlet port, said outlet port having a discharge orifice with a constriction therein to upset the swirling eddy of the discharge jet and make a solid outflowing stream.

7. A steam trap having a suitable casing with its inlet and outlet ports, a ball acting as a valve controlling the outlet port, a cage for holding the ball, and a float operating the cage to operate the ball, part of said cage being movable with the float and part rigid with the casing, that part of the casing movable with the float being adapted to roll the ball along a part of the cage carried by the casing, whereby an intermittent rotating motion is imparted to the ball thus offering a different seating surface on the ball at each operation.

8. A steam trap having a suitable casing with its inlet and outlet ports, a ball acting as a valve controlling the outlet port, a cage for holding the ball, part of said cage, consisting of horizontal pins, movable with the float and part, consisting of pins, two vertical pins rigid with the casing and operating on the same side of the ball, whereby an intermittent rotating motion is imparted to the ball thus offering a different seating surface on the ball at each operation.

In testimony whereof, we have signed our names to this specification, in the presence of two subscribing witnesses.

GEORGE W. LONG.
WILLIAM K. SIMPSON.

Witnesses:
GORHAM CROSLY,
EDWIN SEGER.

Copies of this patent may be obtained for five cents each, by addressing the " Commissioner of Patents. Washington, D. C."

It is hereby certified that in Letters Patent No. 1,123,770, granted January 5, 1915, upon the application of George W. Long, of New York, N. Y., and William K. Simpson, of East Orange, New Jersey, for an improvement in "Steam-Traps," errors appear in the printed specification requiring correction as follows: Page 1, line 74, after the reference-numeral "18" insert the word *which;* page 2, line 59, for the word "construction" read *constriction;* same page and line, for the word "constructions" read *constrictions;* page 3, name of the first-mentioned witness to the signatures to the specification, for "Gorham Crosly" read *Gorham Crosby;* and that the said Letters Patent should be read with these corrections therein that the same may conform to the record of the case in the Patent Office.

Signed and sealed this 9th day of February, A. D., 1915.

[SEAL.]

J. T. NEWTON,
*Acting Commissioner of Patents.*